US010102405B2

(12) United States Patent
Durand

(10) Patent No.: US 10,102,405 B2
(45) Date of Patent: Oct. 16, 2018

(54) ELECTROMAGNETIC COUPLING READER

(71) Applicant: DURA AUTOMOTIVE SYSTEMS SAS, Bievres (FR)

(72) Inventor: Eric Durand, Louveciennes (FR)

(73) Assignee: DURA AUTOMOTIVE SYSTEMS SAS, Bievres (FR)

( * ) Notice: Subject to any disclaimer, the term of this patent is extended or adjusted under 35 U.S.C. 154(b) by 0 days.

(21) Appl. No.: 15/592,652

(22) Filed: May 11, 2017

(65) Prior Publication Data
US 2017/0330000 A1    Nov. 16, 2017

(30) Foreign Application Priority Data

May 12, 2016  (FR) .................... 16 54245

(51) Int. Cl.
*G06K 7/00*    (2006.01)
*G06K 7/10*    (2006.01)
(Continued)

(52) U.S. Cl.
CPC ..... *G06K 7/10207* (2013.01); *G06K 7/10128* (2013.01); *G06K 7/10297* (2013.01);
(Continued)

(58) Field of Classification Search
CPC ..... A61B 1/00016; A61B 8/4472; A61B 8/56; G06K 7/10207; G06K 7/10297; G06K 7/10366; H04W 4/008; H04W 52/0235
(Continued)

(56) References Cited

U.S. PATENT DOCUMENTS

2001/0051766 A1* 12/2001 Gazdzinski ........ A61B 1/00016
                                                                600/309
2003/0104848 A1*  6/2003 Brideglall ............ G06K 7/0008
                                                                455/574
(Continued)

FOREIGN PATENT DOCUMENTS

EP    1148437 A2    10/2001
EP    1840790 A2    10/2007
(Continued)

OTHER PUBLICATIONS

French Search Report for French Serial No. 1654245 dated Jan. 31, 2017, (7 pages).

*Primary Examiner* — Thien M Le
(74) *Attorney, Agent, or Firm* — Reising Ethington P.C.

(57) ABSTRACT

An electromagnetic coupling reader may include:
an antenna,
a management module, and
a supervision unit,
the supervision unit comprising a sleep mode configured to limit energy consumption,
a first wake-up signal enabling the supervision unit to be extracted from the sleep mode,
the management module comprising an energy saving mode consisting of measuring, at regular intervals, an impedance of the antenna in order to detect a presence of a peripheral authorizing an electromagnetic coupling, the wake-up signal being activated by the management module when a peripheral is detected,
the electromagnetic coupling reader comprising a second wake-up signal controlled by a clock configured to extract the supervision unit from the sleep mode at regular intervals.

10 Claims, 2 Drawing Sheets

Figure 1:
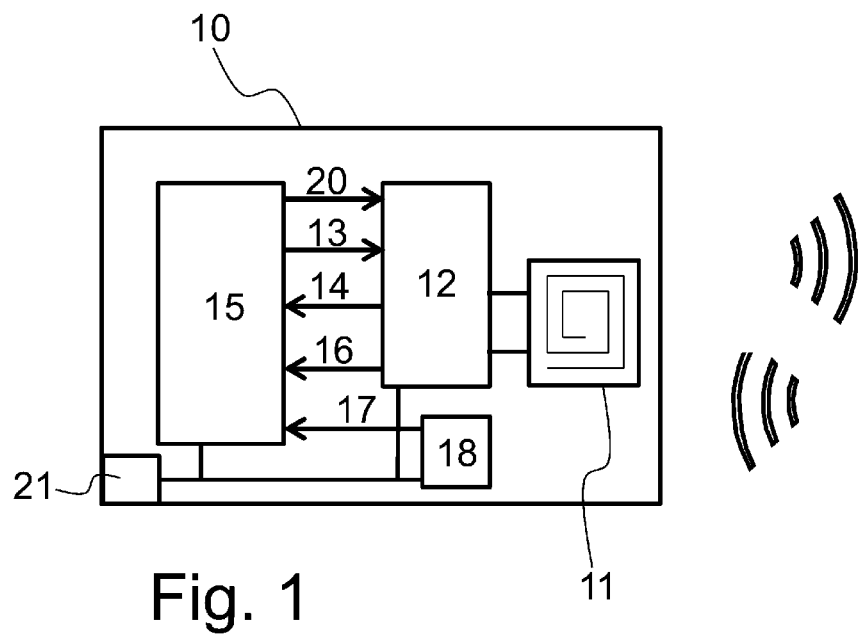

(51) Int. Cl.
*H04W 52/02* (2009.01)
*H04W 4/80* (2018.01)

(52) U.S. Cl.
CPC .... *G06K 7/10366* (2013.01); *H04W 52/0235* (2013.01); *H04W 4/80* (2018.02); *Y02D 70/10* (2018.01)

(58) Field of Classification Search
USPC .......................................................... 235/439
See application file for complete search history.

(56) References Cited

U.S. PATENT DOCUMENTS

| | | | | |
|---|---|---|---|---|
| 2005/0206555 A1* | 9/2005 | Bridgelall | ................. | G01S 5/14 342/127 |
| 2006/0212179 A1* | 9/2006 | Philips | ................. | H04W 4/008 701/1 |
| 2006/0238308 A1* | 10/2006 | Mickle | ............... | G06K 19/0705 340/10.33 |
| 2007/0205873 A1* | 9/2007 | Mickle | ............... | G06K 19/0707 340/10.33 |
| 2008/0231449 A1* | 9/2008 | Moshfeghi | ............. | G01D 21/00 340/572.1 |
| 2012/0071710 A1* | 3/2012 | Gazdzinski | ........ | A61B 1/00016 600/101 |

FOREIGN PATENT DOCUMENTS

| | | |
|---|---|---|
| FR | 3004830 A1 | 10/2014 |
| WO | WO0065551 A1 | 11/2000 |
| WO | WO2009058496 A1 | 5/2009 |

* cited by examiner

ELECTROMAGNETIC COUPLING READER

CROSS REFERENCE TO RELATED APPLICATIONS

This application claims priority to French Patent Application No.: FR1654245 filed May 12, 2016. The content of this priority application is incorporated herein by reference in its entirety.

TECHNICAL FIELD

This invention relates to an electromagnetic coupling reader that has a variety of potential applications.

The invention finds particularly advantageous application for readers integrated into an automotive vehicle enabling the centralized opening of doors.

BACKGROUND

Electromagnetic coupling was originally developed to identify labels (also called tags in English language literature). To that end, an electromagnetic coupling reader comprises an electronic card equipped with an antenna capable of performing an electromagnetic coupling with an antenna of the tag so as to wirelessly power a chip disposed on the tag. The antenna of the tag then sends information present on the chip to the reader so as to identify the tag. This technology is known as RFID, an acronym for Radio Frequency IDentification. RFID technology makes it possible to create applications for access control, barcode reading, traceability of luggage, etc.

Moreover, recent developments concern using RFID technology for performing proximity transactions.

To standardize the exchanges, an NFC (Near Field Communication) standard has been created. This standard is defined by the documents ECMA 340, ETSI TS 102 190, ISO/CEI 14443 and ISO/IEC 18092 which govern protocols for modulation, coding, data transfer speeds, frame formats, as well as the initialization protocols required for collision avoidance.

With the development of NFC technology, an electromagnetic coupling reader can now detect the presence of a smartphone having a virtualization mode of a tag, also called HCE (Host Card Emulation). Thus, an electromagnetic coupling reader can control the opening of an automotive vehicle by a key integrating a tag or by a smartphone having an HCE virtualization mode.

More particularly, the invention relates to the issue of reducing the power consumption of an electromagnetic coupling reader operating in both modes of operation.

An electromagnetic coupling reader conventionally comprises:
- an antenna configured to perform the electromagnetic coupling,
- a management module configured to modulate and transmit an input signal on said antenna, and to demodulate and transmit an output signal received by said antenna, and
- a supervision unit configured to generate said input signal and analyze said output signal in such a way as to organize a wireless communication.

The use of a supervision unit comprising a sleep mode in which the functionalities are limited is well known in the prior art. For example, in the sleep mode the supervision unit is incapable of generating the input signal or analyzing the output signal. It follows that the [energy] consumption of the supervision unit is greatly limited in the sleep mode. Moreover, in the sleep mode, the supervision unit can be awakened by a wake-up signal connected to the management module.

A first energy saving mode consists of using a time delay on the management module to periodically awaken the supervision unit. The supervision unit then generates an input signal in order to detect the presence of an external peripheral. If no signal is received on the antenna in response to the input signal, the supervision unit concludes that no external peripheral is within range of the antenna and returns to the sleep mode.

Otherwise, a radiofrequency communication is established, for example to detect if the external peripheral has unlocking rights for an automotive vehicle. Said first energy saving mode has the advantage of detecting all peripherals: tags or smartphones having an HCE virtualization mode. However, the activation time is long for the supervision unit to generate the input signal and wait for the output signal. The result is that [energy] consumption remains significant.

To decrease consumption even more, the second energy saving mode enables the management module to periodically measure the impedance of the antenna. Indeed, a smartphone having an HCE virtualization mode can create an electromagnetic coupling on the antenna and modify the impedance of the antenna. The awakening of the supervision unit is then performed only when a smartphone having an HCE virtualization mode is actually detected by the management module. This second energy saving mode reduces consumption but does not make it possible to detect tags because their presence does not sufficiently change the impedance of the reader's antenna.

Moreover, for these two energy saving modes, there is a risk of failure of the electromagnetic coupling reader that occurs when the transmission of the wake-up signal between the management module and the supervision unit is defective. Indeed, the circuit can be physically broken or sensitive to electromagnetic disturbances.

At least one technical problem that remains is to obtain an electromagnetic coupling reader of reduced [energy] consumption, allowing the detection of a tag and a smartphone having an HCE virtualization mode, while limiting the risk of failure.

SUMMARY

To resolve the technical problem, a person skilled in the art would have used a component integrating both energy saving modes, such as the component referenced CLCC663 by NXP®.

Furthermore, to prevent malfunctions on the wake-up signal, a person skilled in the art would have duplicated the wake-up signal and/or would have improved the stability or shielding of the wake-up signal.

As set forth herein, in at least some implementations, the technical problem is solved by using an electromagnetic coupling reader integrating the second energy saving mode managed by the management module, and by integrating another energy saving mode independent of the management module and configured to awaken the supervision unit periodically.

To that end, at least some implementations relate to an electromagnetic coupling reader comprising:
- an antenna configured to perform the electromagnetic coupling, a management module configured to modulate and transmit an input signal on said antenna, and to demodulate and transmit an output signal received by said antenna, a supervision unit configured to generate said input signal and analyze said output signal in such a way as to organize a wireless communication, said supervision unit comprising a sleep mode configured to limit energy consumption, a first wake-up signal enabling said supervision unit to exit said sleep mode, said management module comprising an energy saving mode consisting of measuring, at regular intervals, an impedance of said antenna in order to detect the presence of a peripheral authorizing an electromagnetic coupling, said wake-up signal being activated by said management module when a peripheral is detected, and a second wake-up signal controlled by a clock configured to extract said supervision unit from said sleep mode at regular intervals.

The system/reader thus makes it possible to detect, with a small amount of energy, a smartphone having an HCE virtualization mode, by analysis of the antenna's impedance. Moreover, the supervision unit is awakened periodically to detect the presence of tags.

Furthermore, the periodic awakening of the supervision unit is ensured by a device independent of the management module: a second wake-up signal and a clock. According to the disclosure, the clock and the second wake-up signal can be integrated into the supervision unit or implemented on an electronic card supporting the supervision unit.

The system and reader thus makes it possible to withstand a failure of the first wake-up signal. Moreover, when the first wake-up signal is defective, the electromagnetic coupling reader continues to operate with reduced performance, by using only the periodic wake-up phases generated by the clock and the second wake-up signal.

According to one embodiment of the invention, said regular intervals of said second wake-up signal are greater than said regular intervals of said energy saving mode. Said embodiment makes it possible to limit consumption, because the supervision unit consumes more energy than the management module.

According to one embodiment of the invention, said regular intervals of said second wake-up signal have a period greater than 1 s. Preferably, said regular intervals of said second wake-up signal have a period substantially equal to 2 s. This embodiment makes it possible to obtain a good compromise between detection time and consumption.

According to one embodiment of the invention, said energy saving mode has a waiting period and a detection period. Preferably, said waiting period is between 35 and 45 ms.

Even more preferably, said waiting period is substantially equal to 40 ms. Preferably, said detection period is between 50 and 150 μs. Even more preferably, said detection period is substantially equal to 100 μs.

Said configuration values of the energy saving mode make it possible to obtain an electromagnetic coupling reader for which [energy] consumption is less than 1 mA per hour.

According to one embodiment, said supervision unit implements the NFC protocol.

BRIEF DESCRIPTION OF THE ACCOMPANYING DRAWINGS

Figure 2:
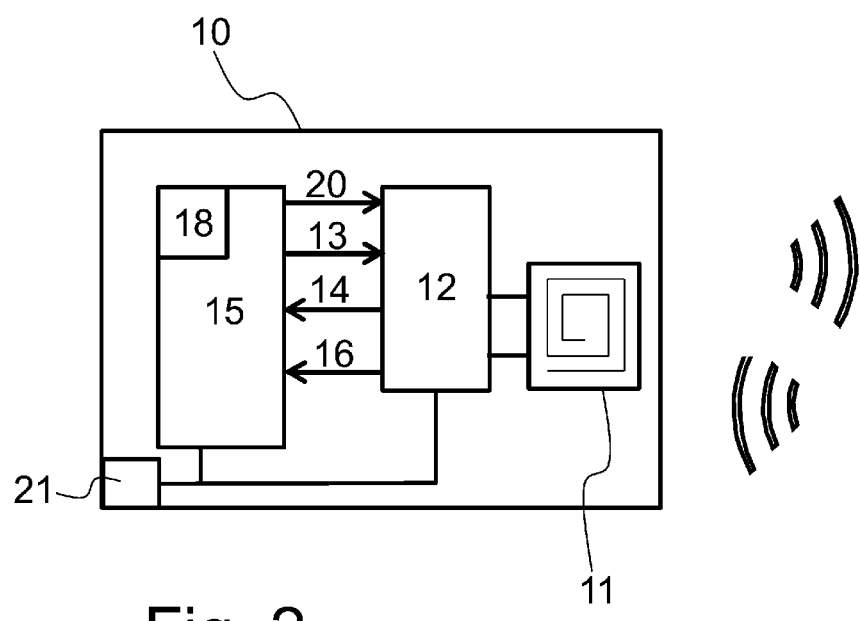
Figure 3:
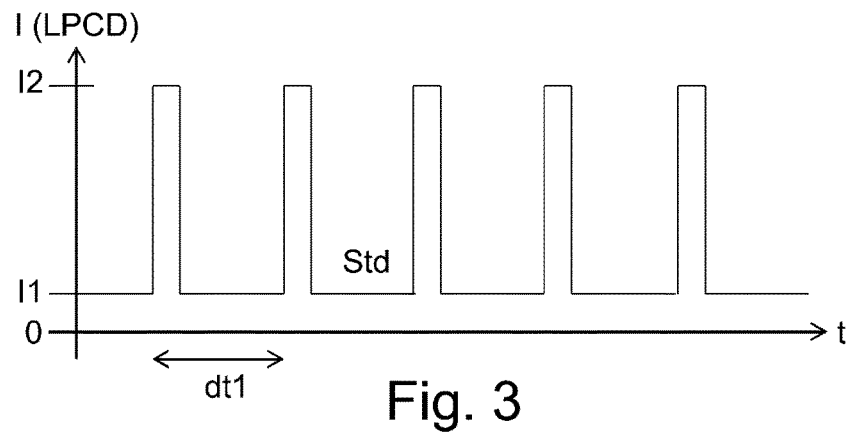
Figure 4:
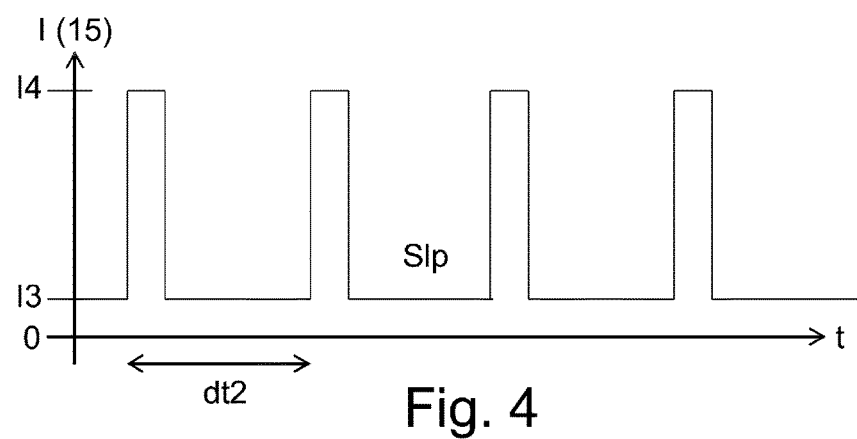

The method and at least some of its advantages will become more apparent from the following disclosure of the embodiments, given by way of a non-limiting example, supported by the attached figures in which FIGS. 1 to 4 represent:

FIG. 1: a schematic representation of an electromagnetic coupling reader according to a first embodiment of the invention;

FIG. 2: a schematic representation of an electromagnetic coupling reader according to a second embodiment of the invention;

FIG. 3: a temporal representation of the operation of the management module of the electromagnetic coupling reader of FIG. 1; and FIG. 4: a temporal representation of the operation of the supervision unit of the electromagnetic coupling reader of FIG. 1.

DETAILED DESCRIPTION

FIG. 1 illustrates an electromagnetic coupling reader 10 comprising an antenna 11 connected to a management module 12. The antenna 11 is preferably produced in the form of a patch antenna having a substrate on which a circuit of conductive material is disposed. The introduction of a current onto the conductive material of the antenna 11 creates a magnetic field.

The management module 12 produces a modulation of the current emitted by the antenna 11 in such a way as to transmit an input signal 13 received by the management module 12. The management module 12 also analyzes the signals received by the antenna 11 and performs a demodulation so as to obtain an output signal 14.

The input signal 13 and output signal 14 are connected to a supervision unit 15 which organizes the wireless communication. The communication can utilize all possible electromagnetic coupling communication protocols.

Preferably, the electromagnetic coupling protocol of the NFC technology is implemented by the supervision unit 15. The supervision unit 15 can be a microcontroller, a microprocessor, an application-specific integrated circuit (ASIC), a field-programmable gate array (FPGA), or any other equivalent component.

The management module 12 integrates an LPCD energy saving mode, illustrated in FIG. 3. In order to limit general current consumption, the management module 12 has a waiting period Std in which the management module 12 uses a small amount of current I1 and a detection period in which the management module 12 uses a greater amount of current I2. In the detection period, the management module 12 measures the impedance of the antenna 11 in order to determine if an external peripheral is applying a magnetic field to the antenna 11. When no modification of the impedance of the antenna 11 is detected, a new cycle comprising a waiting period Std and a detection period is carried out. The period of said cycles without detection is denoted dt1. For example, the components CLRC663, MFRC631, MFRC630, SLRC610 by NPX® can be used as management module 12.

The precise configuration of said detection and waiting periods Std makes it possible to achieve an effective compromise between the detection reactivity and decrease in [energy] consumption. Preferably, said waiting period is between 35 and 45 ms. Preferably, said waiting period is substantially equal to 40 ms. Preferably, said detection period Std is between 50 and 150 μs. Preferably, said detection period Std is substantially equal to 100 μs.

The supervision unit 15 also has a sleep mode Slp, illustrated in FIG. 4. In order to limit general current consumption, the supervision unit 15 has a sleep period Slp in which the supervision unit 15 uses a small amount of current I3 and an activation period in which the supervision unit 15 uses a greater amount of current I4. In the activation period, the supervision unit 15 emits an input signal 13 in accordance with a predefined protocol and waits for a response on the output signal 14. When no output signal 14 is received, the supervision unit 15 returns to the sleep mode Slp.

In order to extract the supervision unit 15 from the sleep mode Slp, a first wake-up signal 16 is connected between the management module 12 and the supervision unit 15 so as to awaken the supervision unit 15 when the presence of an external peripheral is detected within the detection period of the management module 12.

It is also proposed to use a second wake-up signal 17 powered by a clock 18 configured to regularly awaken the supervision unit 15. Preferably the wake-up period dt2 of the supervision unit 15 is greater than the activation period dt1 of the management module 12. Preferably the wake-up period dt2 of the supervision unit 15 is greater than 1 s. Even more preferably, the wake-up period dt2 of the supervision unit 15 is substantially equal to 2 s.

The supervision unit 15 also transmits a clock signal 20 so as to clock the exchanges between the supervision unit 15 and the management module 12.

Lastly, the electromagnetic coupling reader 10 is connected to an external power supply 21 to power the supervision unit 15, the management module 12 and the clock 18.

Alternatively, as illustrated in FIG. 2, the clock 18 can be integrated into the supervision unit 15 without changing the invention. In this embodiment, the second wake-up signal 17 is an internal signal in the supervision unit 15.

It is thus possible to detect the presence of a tag or a smartphone having an HCE virtualization mode. When the external peripheral corresponds to a smartphone having an HCE virtualization mode, it is quickly detected by the management module 12 by measuring the impedance of the antenna 11. Moreover, a tag can be detected when the supervision unit 15 is awakened by the clock 18.

Furthermore, the electromagnetic coupling reader 10 also makes it possible to detect the smartphone having an HCE virtualization mode when the first wake-up signal 16 is inoperative.

The invention claimed is:

1. An electromagnetic coupling reader, comprising:
   an antenna configured to perform the electromagnetic coupling,
   a management module configured to modulate and transmit an input signal on said antenna, and to demodulate and transmit an output signal received by said antenna,
   a supervision unit configured to generate said input signal and analyze said output signal in such a way as to organize a wireless communication,
   said supervision unit comprising a sleep mode configured to limit energy consumption, a first wake-up signal enabling said supervision unit to exit said sleep mode,
   said management module comprising an energy saving mode consisting of measuring, at regular intervals, an impedance of said antenna in order to detect the presence of a peripheral authorizing an electromagnetic coupling, said wake-up signal being activated by said management module when a peripheral is detected, and
   a second wake-up signal controlled by a clock configured to extract said supervision unit from said sleep mode at regular intervals.

2. The electromagnetic coupling reader according to claim 1, wherein said regular intervals of said second wake-up signal are greater than said regular intervals of said energy saving mode.

3. The electromagnetic coupling reader according to claim 1, wherein said regular intervals of said second wake-up signal have a period of more than 1 s.

4. The electromagnetic coupling reader according to claim 1, wherein said regular intervals of said second wake-up signal have a period substantially equal to 2 s.

5. An electromagnetic coupling reader, comprising:
   an antenna configured to perform the electromagnetic coupling,
   a management module configured to modulate and transmit an input signal on said antenna, and to demodulate and transmit an output signal received by said antenna,
   a supervision unit configured to generate said input signal and analyze said output signal in such a way as to organize a wireless communication,
   said supervision unit comprising a sleep mode configured to limit energy consumption, a first wake-up signal enabling said supervision unit to exit said sleep mode,
   said management module comprising an energy saving mode consisting of measuring, at regular intervals, an impedance of said antenna in order to detect the presence of a peripheral authorizing an electromagnetic coupling, said wake-up signal being activated by said management module when a peripheral is detected, and
   a second wake-up signal controlled by a clock configured to extract said supervision unit from said sleep mode at regular intervals, wherein said energy saving mode has a waiting period and a detection period.

6. The electromagnetic coupling reader according to claim 5, wherein said waiting period is between 35 and 45 ms.

7. The electromagnetic coupling reader according to claim 5, wherein said waiting period is substantially equal to 40 ms.

8. The electromagnetic coupling reader according to claim 5, wherein said detection period is between 50 and 150 µs.

9. The electromagnetic coupling reader according to claim 5, wherein said detection period is substantially equal to 100 µs.

10. The electromagnetic coupling reader according to claim 1, wherein said supervision unit implements the NFC protocol.

* * * * *